Jan. 24, 1967  KATSUJIRO HARADA  3,300,220
MUSIC BOX

Filed Dec. 20, 1963  7 Sheets-Sheet 1

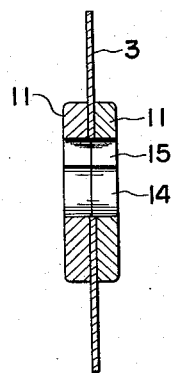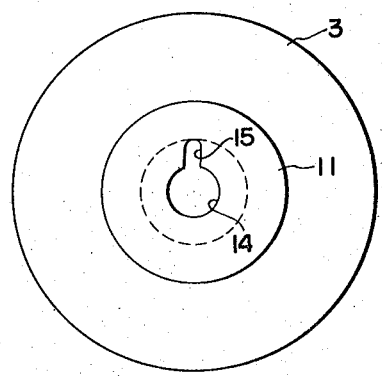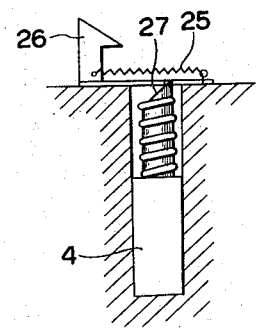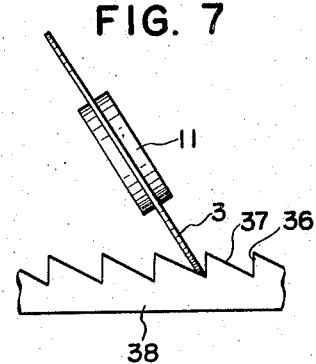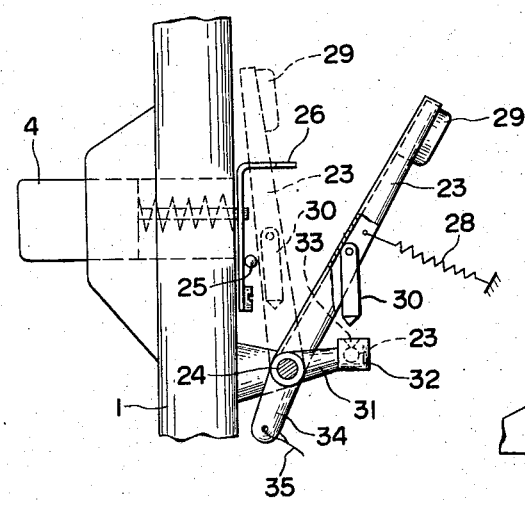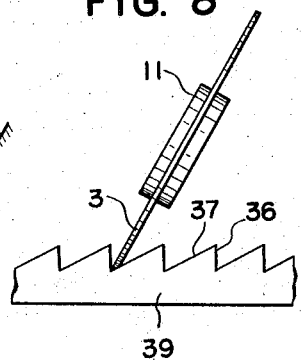

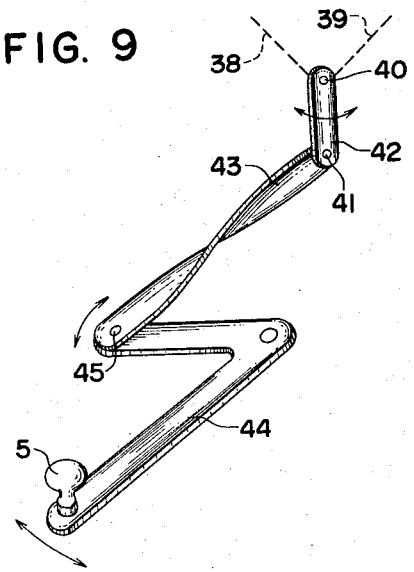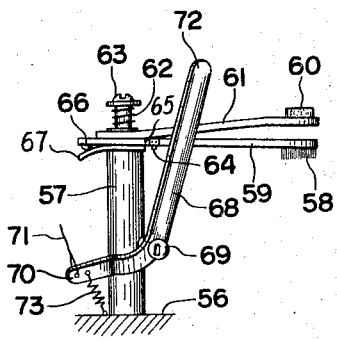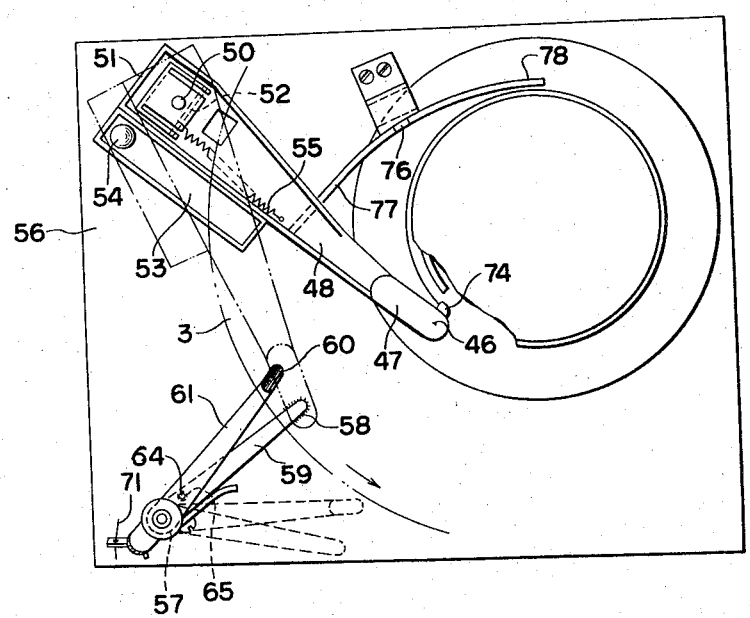

Jan. 24, 1967    KATSUJIRO HARADA    3,300,220
MUSIC BOX

Filed Dec. 20, 1963    7 Sheets-Sheet 5

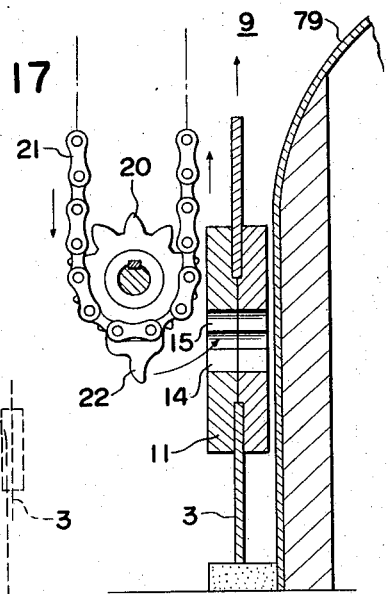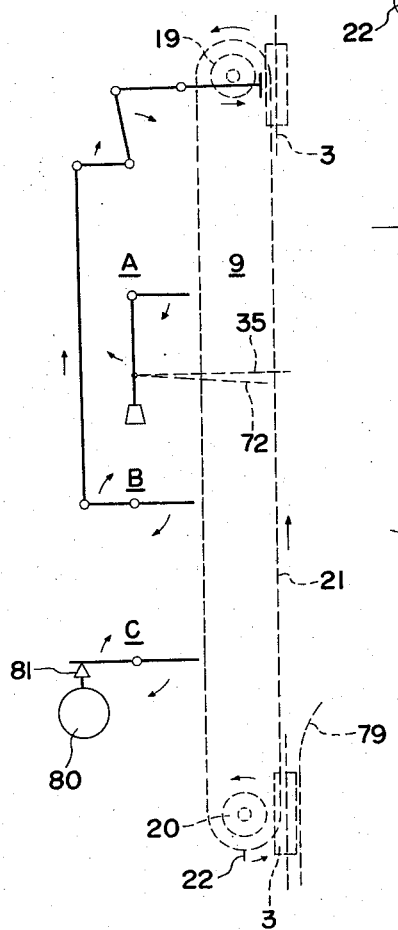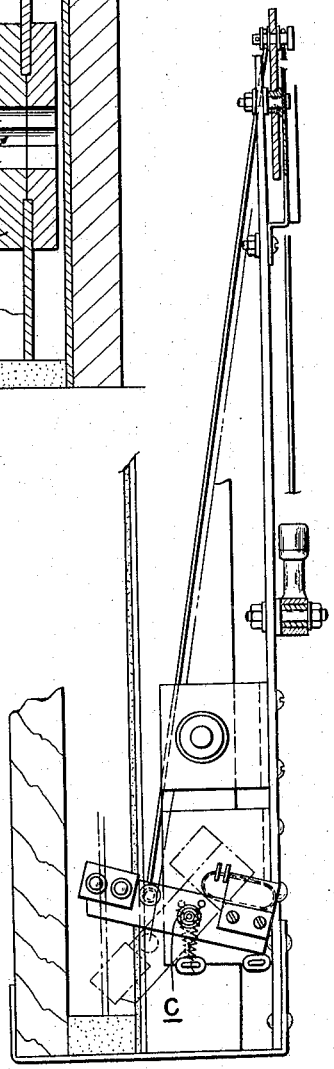

FIG. 20
FIG. 19
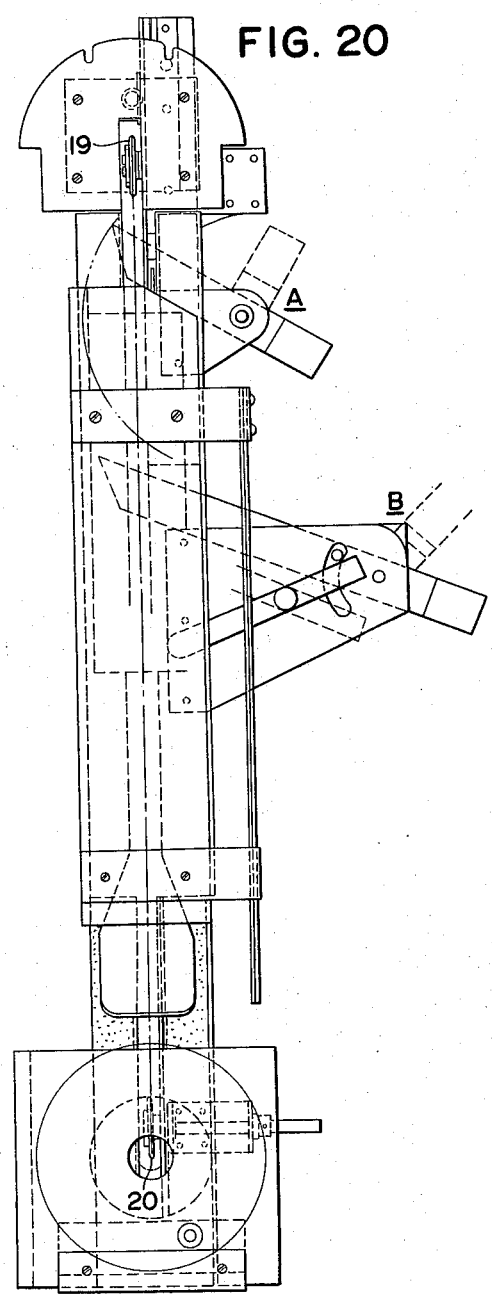
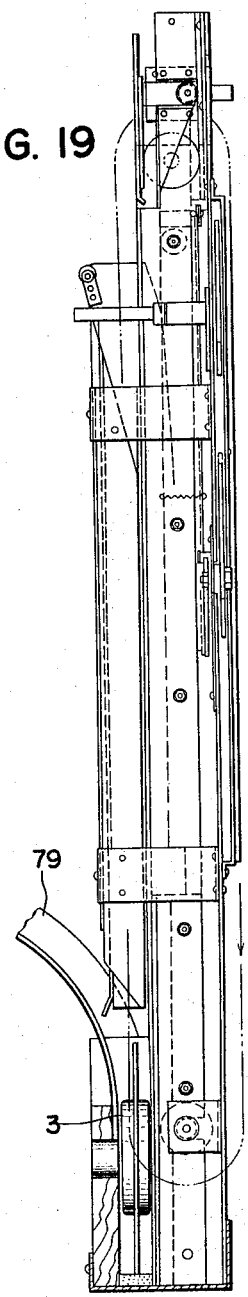

United States Patent Office

3,300,220
Patented Jan. 24, 1967

3,300,220
MUSIC BOX
Katsujiro Harada, 96 Nishitakaido 1-chome, Tokyo, Japan
Filed Dec. 20, 1963, Ser. No. 332,029
Claims priority, application Japan, Dec. 25, 1962, 37/58,763; July 1, 1963 (utility model), 38/48,671
4 Claims. (Cl. 274—10)

This invention relates to a novel music box capable of automatically playing a number of phonograph records continuously.

Hitherto, the prior art music boxes of the type referred to are very expensive because of their complex mechanism wherein, for instance, memorizing means equipped with relays are caused to retain symbols of desired phonograph records. Moreover, with the complex mechanisms, the operation is troublesome and therefore the repair is not very simple whenever an accident occurs. Such equipment also involves various other disadvantages.

On the other hand, the present invention provides a music box which eliminates these disadvantages. The substance of this invention lies in a music box, including a row of a number of phonograph records simultaneously provided upright on a guiding member, a pushing-out mechanism to select any suitable one by pushing-out from the phonograph record series, a lateral picking-up device, a guiding member for guiding the selected phonograph record onto a turn table, an automatic performance device for the phonograph record loaded on the turn table, a discharging guiding member to discharge the record after finishing the performance thereof, and an elevator mechanism to return the discharging record to the phonograph record row whereby one of the series of phonograph records is guided on the turn table through the guiding member by pushing the push button and being subjected to an automatic performance in the performance device and thereafter returned to the phonograph record row by the elevator mechanism through the discharge guiding member. Thus, according to the present invention, a music box can be provided, which is of simple construction and accordingly very simple in operation, and simultaneously has a low accident rate and low cost. Hitherto, as compared with known music boxes, in the music boxes according to the present invention, any suitable number of records can consecutively be played automatically by only changing a switch, but without coining. Simultaneously, after all the records have been played, the device returns to the starting condition, as in an automatic performance. Usually, the selection of records takes an average of one minute, whereas, the present music box can start in 3 to 4 seconds and, in addition, the servicing does not take very long, as the mechanism is simple. Thus, the present music box has various advantages.

In addition, the present invention also relates to a device for automatically playing many phonograph records, wherein a number of phonograph record units, both having a sliding body provided on each side, are arranged in a row on the upper portion of the front surface of the outer casing, and wherein the lateral picking-up means are operated according to the desired music or tune, so that the desired record side may be played entirely mechanically and automatically by pushing a button below the desired phonograph record, and so that the record upon being played may be returned automatically to the initial row of phonograph records.

Thus, the object of the present invention is to provide an automatic performance device, wherein either surface of an ordinary two sided record is operated selectively and automatically, and also wherein the record having been played can be returned entirely automatically to the initial row of phonograph records.

Another object of the present invention is to provide an automatic performance device, wherein the interval of time between the pushing of a button and the playing of a phonograph record may be shortened by operating entirely mechanically in selecting the desired record, and simultaneously automatically and consecutively repeating the performance and returning, if necessary in order to avoid the troublesomeness of continuous performance.

In the following, the present invention will be described in detail with reference to one embodiment of the present invention in connection with the accompanying drawings. However, it is of course possible to make many suitable modifications, without departing from the scope and spirit of this invention as defined in the appended claims. It is to be noted that similar parts are represented by similar symbols. The accompanying drawings represent one embodiment of this invention, in which FIG. 1 is a front view of the music box partially in cross section;

FIG. 3 is a front view of the phonograph record to be used for the music box of FIG. 1;

FIG. 4 is a side view of FIG. 3;

FIG. 5 is a schematic view showing a pushing-in mechanism for a record in the music box;

FIG. 6 is a detailed view of the push button portion for the pushing mechanism FIG. 5;

FIGS. 7 to 9 show the essential parts of a lateral picking-up device.

FIG. 10 is a plan view showing the relationship between the record stand, rocking arm and needle sweeping device;

FIG. 11 is a side view of the needle sweeping device;

FIG. 17 is a detailed sectional view showing a portion of the restoring device for a record in the music box;

FIG. 18 is an illustration of an elevator system in the music box;

FIG. 19 is a side view of the mechanism of the elevator system;

FIGS. 20 and 21 are each front views of the elevator mechanism.

Figure 1:
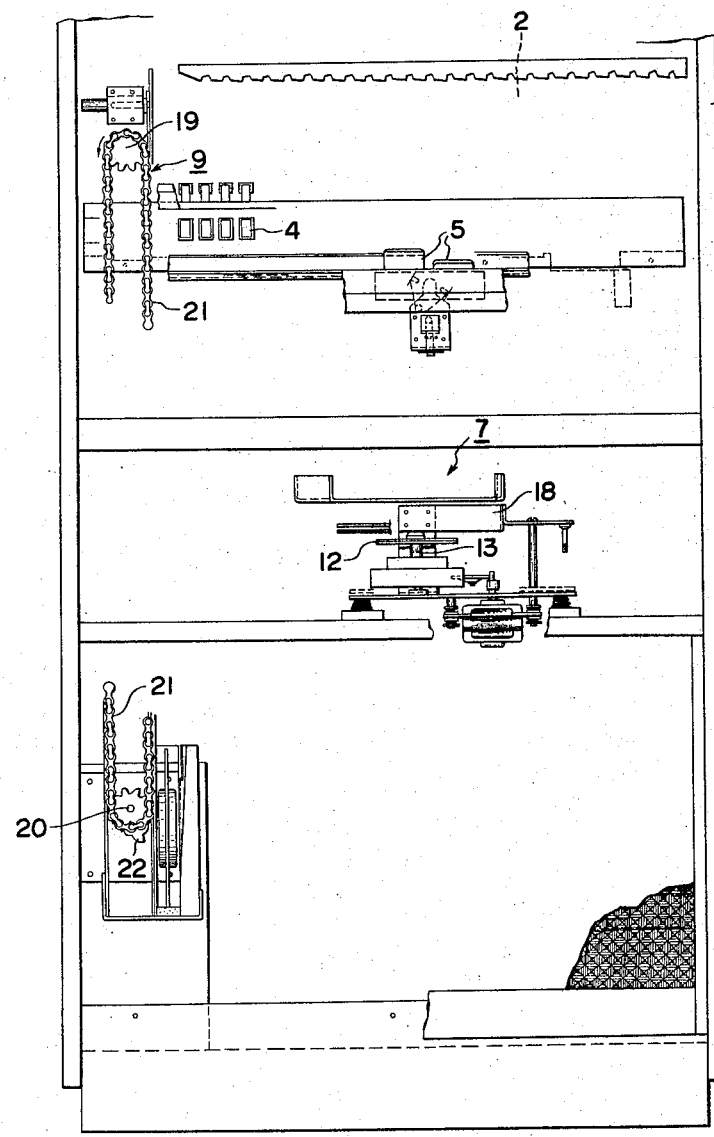
Figure 2:
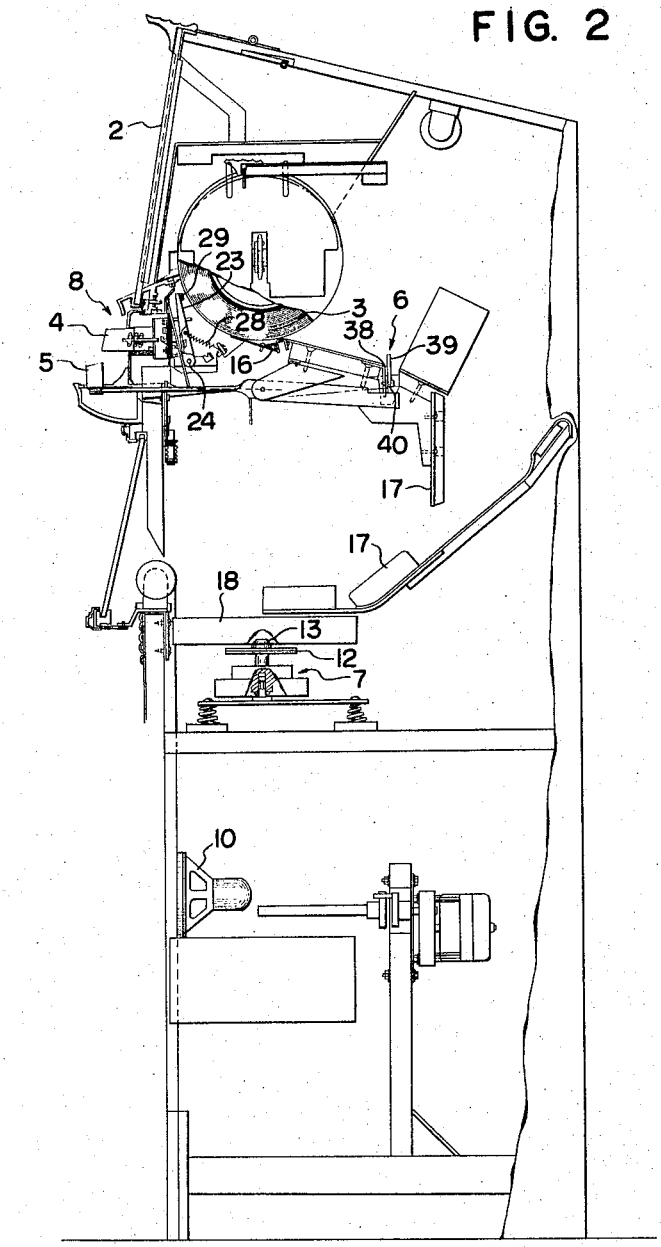
FIG. 2 is a right hand side view of the main box of FIG. 1.

To begin with, in FIGS. 1 and 2, 1 is an outer casing; 2 is a transparent cover plate; 3 is a phonograph record; 4 is a push button; 5 is a knob of lateral picking-up device 6; 7 is a performance device using phonograph record 3 for downward performance; 8 is a pushing-in mechanism for records 3; 9 is an elevator mechanism; and 10 represents a speaker. The record (or phonograph record) 3 is of a construction of any suitable commercial two face record having each a holder 11 at the central portion of each side as illustrated in FIGS. 3 and 4. At the center of the holder 11 is formed a fixing hole indicated as 14 for securing the record to a rotary shaft 13 of turntable 12. Notches 15 are formed along a part of the periphery of the fixing hole 14. Moreover, the lower part of the phonograph record 3 is horizontally, lightly movably held by a guiding member 16 arranged between the pushing-in mechanism 8 and the lateral picking-up device 6. The aforementioned pushing-in mechanism 8 is combined with the front push button 4 of the outer casing 1 opposite the outer edge of each record 3, while the lateral picking-up device 6 is connected with a guiding frame 18 for record 3 located above a turn table 12 through a suitable guiding trough 17. Further, the elevator mechanism 9 is driven by a chain belt 21 passed endlessly over upper and lower sprocket wheels 19 and 20 appropriately. A hanging claw 22 secured to the chain belt 21 is engaged in the notch 15 formed in a holder 11 of the record during the returning movement of record 3, thereby serving to keep the forward posture of the holder 11.

A pushing-out lever 23 is rotatably pivoted on a shaft 24, as an axis of rotation, which is provided within the outer casing 1 as illustrated in FIG. 5, and the lever 23 is normally hung on a clutch 26 in a stretched state by a spring 25, and held substantially vertically. However, when push button 4 is disengaged from the clutch 26 by pushing on button 4 on an inclined surface 27 as shown in FIG. 6, lever 23 is pulled clockwise in FIG. 5 by the spring force of a spring 28. A rubber piece 29 secured at the top end of the pushing-out lever 23 will be brought in contact with the outer periphery of record 3, thereby pushing the record to the right of the guiding member 16 in FIG. 1.

The lever 23 then has to be returned to the normal position shown in dotted line (FIG. 5), before the phonograph record having been played is returned to its parallel position. For this purpose, each lever 23 has a weight 30, the lower end of which is pointed, and an upper arm 31 is secured on each end of shaft 24, and along a transversal rod 32 connected with the front end of the upper arm 31 recesses 33 are arranged with the same pitch as the lower pointed end of weights 30 and corresponding in number to that of the weights. When the upper arm 31 is raised to raise the transversal rod 32, the lower pointed end of each weight 30 will engage with the corresponding recess 33 and, as a result, the lever 23 will be set upright with the rising of upper arm 31 and engage with the clutch 26 and return to its normal position. In this case, in order to raise the upper arm 31, a lower arm 34 is projected on the opposite side of the upper arm 31, the front end of which is connected with a pulling rope 35 connected in turn appropriately with the returning device to be described later.

The lateral picking-up device 6 shown in FIG. 2 is constructed in such a way that as shown in FIGS. 7 to 9 serrated direction plates 38 and 39 consisting of an upright edge 36 and an inclined edge 37 are intersected at right angle with their phases reversed, the intersecting axis 40 being pivoted with perpendicularly intersecting links 42 and 43 through a pin 41 and simultaneously the perpendicularly intersecting link 43 and a crank lever 44 are pivotally connected with a pin 45. The directional plates 38 and 39 each having a row of serrated teeth may be turned to the right or left by moving laterally the knob 5 secured to the front end of the crank lever 44. Thus, the phonograph record 3 is inclined according to the direction the directional plates 38 and 39 are employed, the record reaching the guiding frame 18 on the performance device 7 by means of the guiding trough 17 illustrated in FIG. 2. Simultaneously with the pushing of the button 4, the motor circuit, not illustrated, for the performance device 7 is closed, and the turntable 12 is set in rotation as soon as the record 3 reaches the performance device 7.

Figure 12:
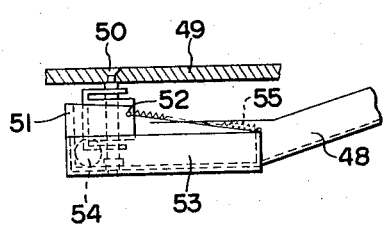
FIG. 12 is a side view showing the relationship between the loading stand and rocking arm.
Figure 15:
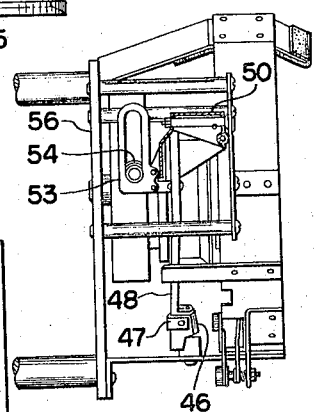
FIGS. 15 and 16 are respectively the left hand side and the right hand side views of FIG. 10.
Figure 13:
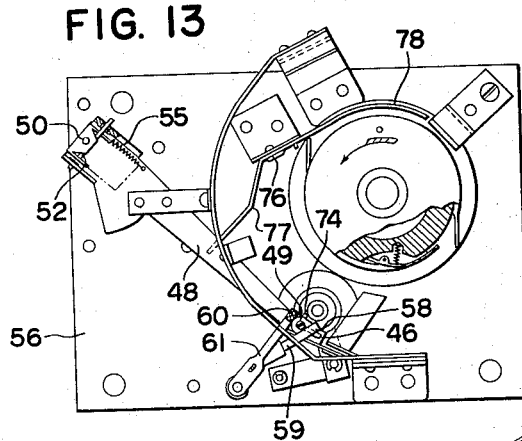
FIGS. 13 and 14 are respectively a plan and a front view of the example of FIG. 10.
Figure 16:
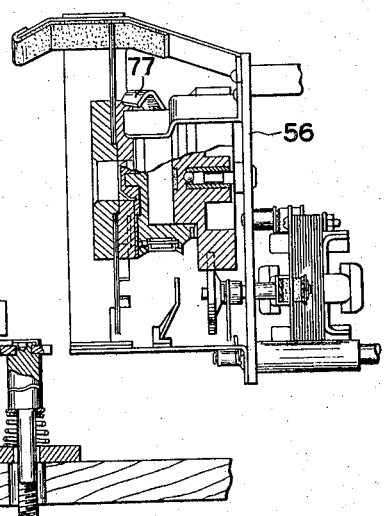
Figure 14:
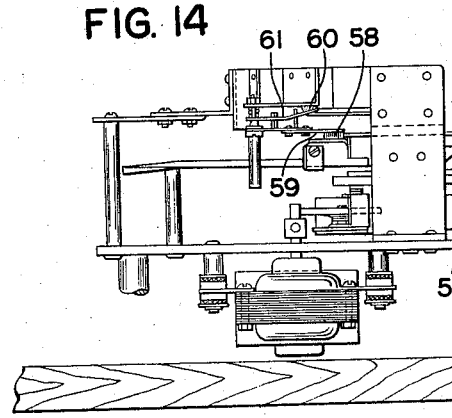

Referring to the performance device 7, it is generally illustrated in FIGS. 10 to 12. On the lower side of record 3 there is provided a rocking arm 48 having a cartridge 47 provided with a needle 46 on the upper side, the rocking arm 48 being guided by the needle 46 and shifted on the lower side of the record. Moreover, the rocking arm 48 is held on a frame body 51 pivotally held by a supporting column 50 which is stood upright on the lower surface of a stand 49, in such a fashion that the rocking arm 48 may be rocked about a transversal pin 52. A trough body 53 with both ends closed is arranged in parallel in the longitudinal direction of the rocking arm 48 on one side adjacent the root portion of the rocking arm 48, and a ball 54 of a suitable weight is put in the trough 53 as capable of revolving longitudinally of the trough. In this case, as the rocking arm 48 is extended on one side of the supporting column 50, a suitable resilient spring 55 is used for balancing the unbalance due to its weight, in order to appropriately control the pressure exerted on the record 3 by the needle 46 automatically through a change of location of the ball 54.

In the performance device 7, before the performance is started by the needle 46 coming in contact with the record 3, the needle should be cleaned automatically, and this is done with an automatic device provided. Namely, as shown in FIG. 10, on a stand frame 56, a support 57 (FIG. 11) is provided upright opposite the supporting column 50 of the rocking arm 48, and a brush arm piece 59 secured downwardly with a brush 58 above the support 57 is movably pivoted, and a driver 61 having a rubber piece 60 is put on the upper surface of the front end of the arm piece 59 with a slight partial clearance and clamped together through an appropriate spring 62 by means of a stud 63. Adjacent the root of the driver 61, a pin 64 is downwardly protruded, which is detachably inserted in a hole 65 formed in the brush arm piece 59 to enable the driver 61 to effect a lateral movement together with the arm piece 59, while making an up-and-down motion, extending in the opposite direction of the root portion of the arm piece 59. A projection 66 is formed at the lower end of the rest portion of the arm piece 59, and the lower surface of the projection 66 is brought in contact with a spring 67 secured to the support 57 under pressure, the outer rocking end of brush arm piece 59 being slightly extended outwardly by taking advantage of the steep inclination of the pressure contact surface. Thus, when, in the needle cleaner mechanism constructed as mentioned before, the front ends of the brush arm piece 59 and driver 61 are in advance respectively positioned as shown in FIG. 10 inside the outer periphery of record 3, the driver 61 will be turned around the support 57, because of the rubber piece 60 coming in contact with the lower surface of the record, upon the record being rotated in the direction of the arrow, that is, counterclockwise, the brush arm piece 59 in combination with the driver 61 is revolved and the needle 46 is cleaned with the brush 58 mounted on the front end. The record 3 is rotated in the direction of the arrow, while the brush mechanism is depressed to the dotted line position a short distance from the record 3. Then, upon the departure of the driver 61 and brush arm piece 59 from record 3, the rocking arm 48 is raised, while the ball body 54 is shifted to the root portion of the trough body 53, and the needle 46 comes quietly in contact with the record 3 to automatically start the performance. In order to return the driver 61 and brush arm piece 59 for the needle of the needle cleaning mechanism retained at the position spaced from the record 3 after the performance has been finished, the distorted bell-crank 68 is inclined in a fixed degree by a pin 69 below the side surface of the support 57 and, when one arm member 70 of the bell crank 68 is raised upward by the rope 71, the brush arm piece 59 and driver 61 are pushed forward by the front end of the other arm member 72, to return them to the original position. Upon slackening of the traction of rope 71, the bell crank 68 will return to the original position. In this case, the rope 71 acts also in the role of returning the rocking arm 48, in addition to the returning action toward the original position of the brush 58.

When the record 3 has been played, the rocking arm 48 is pushed down by a hook 74 protruded on the side of the cartridge 47 being guided in a guiding groove 75 (FIG. 12) engraved on the side of record stand 49, lifting one end 78 of a lever 77 pivotally held by a pin 76 during the movement, to detach the record 3 loaded on the record stand 56 at the front end. Then, the record 3 is thrown outward in inclining by means of the stand 57 while being rotated. The phonograph record having thus been thrown is introduced into the returning device A of the elevator mechanism 9 as illustrated in FIGS. 19 to 21 through the discharging guiding trough 79 (see FIGS. 17 to 19).

The performance device shown in FIGS. 10 to 12, a part of which device is also shown as a performance device 7, has examples illustrated in FIGS. 13 to 16, where similar parts are shown by similar symbols.

In the elevator mechanism 9 of the record 3 as shown in FIGS. 17 to 21, the phonograph record 3 transmitted in the returning device A actuates to close by its weight the switch 81 for the motor 80 to drive the chainbelt 21 in the direction of the arrow in FIG. 17, which is counterclockwise. In this case, as the clutch claw 22 is secured to the chain belt 21, the clutch claw engages in a circular hole 14 formed in the holder 11 of record 3 to raise the record. Since the record 3 is raised while being rotated, with the disc of record 3, the friction of one side surface being made higher as compared with that of any other surface, the forward surfaces of record 3 are made even by the clutch claw 22 of chain belt 21 being engaged in the notch 15 of the circular hole 14.

After the record 3 has been returned in the return device A through the record-discharge-guiding trough 79, the record 3 is shifted to the highest position during travel of the chain belt 21 as shown in FIG. 18 and that highest position is retained and the clutch claw 22 actuates on the returning device A and pulls the rope 35 (FIG. 5) and 72 (FIG. 11) while the claw 22 is detached from the record 3 and is performing the descending movement, to return the pushing-out lever 23 and brush 58. Then the clutch claw 22 actuates the returning device B to push other records into the record row, and then the clutch claw 22 actuates the returning mechanism C to cut off the switch 81 of the motor 80 thereby stopping the travel of the chain belt 21.

Further, in the device according to this invention it is easy to start the performance by coining in order to make the performance valuable. In addition, it is easy to obtain performance for an extended time continuously with one surface or both surfaces of the record without pushing the button. Furthermore, instead of the vacuum tube being used for the device, transistors are used to make current flow only when a coin is put therein, thereby decreasing any heat radiation of the device, and to protect damage of each of the constructional parts including the amplifiers.

What is claimed:
1. In a music box, the combination comprising
   a turn table and automatic record playing means therefor,
   a row of phonograph records,
   means for supporting the row of phonograph records,
   push means for selecting a record by pushing it out from the supported row of phonograph records including latched lever means and push button means to release said lever means which pushes out a selected record,
   lateral pick-up means for picking up the selected record,
   guide means receiving the selected record from said lateral pick-up means and guiding it onto said turn table for playing thereon,
   discharging-guide means for discharging a played record from said turn table,
   a trough operatively disposed relative to said discharging-guide means for receiving the played record therefrom,
   an elevator mechanism including gripping means engaging the played record and returning it to said supporting means.
2. The invention as recited in claim 1 wherein said automatic record playing means includes a pivotally mounted arm having a record engaging needle on one end, said needle being operatively disposed below said turn table to engage the lower surface of a record thereon, balancing means on said arm to maintain engagement of said needle with said lower surface, and needle cleaning means including a brush pivoted for movement against said needle.
3. The invention as recited in claim 1 wherein each of said phonograph records includes a holder on each surface thereof to space the records on said supporting means, each record and its holders having centrally aligned holes with the record hole being larger in diameter than the holes in the holders, and aligned notch means extending from each holder hole, and wherein said elevator mechanism includes an endless chain and said gripping means includes hook means received in the aligned notch means in the holders.
4. A phonograph record comprising
   a disc element having a central aperture,
   a holder centrally secured to each side of said disc element to protect a grooved surface on said disc element and to provide added weight to said disc element,
   each of said holders having a central opening being smaller in diameter than the central aperture of said disc element,
   said central openings and said central aperture being aligned on a common axis to be adapted for receiving a record player spindle,
   each of said holders having a notched portion radially extending from a peripheral portion of its central opening,
   said notched portions in said holders being aligned with each other and terminating adjacent the circumference defined by the central aperture, and
   said notched portions defining hook engaging means for transferring said disc element whereby said disc element is rotated during a transferring operation to its proper upright position as indicated by said notched portions.

References Cited by the Examiner

UNITED STATES PATENTS 3,124,034   3/1964   Edhouse.

NORTON ANSHER, *Primary Examiner.*

J. F. PETERS, *Assistant Examiner.*